United States Patent
Rastgar et al.

(10) Patent No.: US 9,767,378 B2
(45) Date of Patent: Sep. 19, 2017

(54) METHOD AND SYSTEM TO ADAPTIVELY TRACK OBJECTS

(71) Applicant: SONY CORPORATION, Tokyo (JP)

(72) Inventors: Houman Rastgar, Campbell, CA (US); Alexander Berestov, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 14/840,260

(22) Filed: Aug. 31, 2015

(65) Prior Publication Data

US 2017/0061241 A1 Mar. 2, 2017

(51) Int. Cl.
| | | |
|---|---|---|
| *G06K 9/00* | (2006.01) | |
| *G06K 9/52* | (2006.01) | |
| *G06K 9/62* | (2006.01) | |

(52) U.S. Cl.
CPC ............ *G06K 9/52* (2013.01); *G06K 9/00758* (2013.01); *G06K 9/6215* (2013.01)

(58) Field of Classification Search
None
See application file for complete search history.

(56) References Cited

U.S. PATENT DOCUMENTS

| | | | | |
|---|---|---|---|---|
| 6,185,314 B1* | 2/2001 | Crabtree | ............... | G01S 3/7865 348/169 |
| 7,394,916 B2 | 7/2008 | Brodsky et al. | | |
| 8,121,346 B2 | 2/2012 | Williams | | |
| 8,462,155 B1* | 6/2013 | Allen | ...................... | G06T 17/00 345/420 |
| 2004/0186816 A1* | 9/2004 | Lienhart | ............ | G06K 9/00335 706/20 |
| 2004/0234136 A1* | 11/2004 | Zhu | ........................ | G06K 9/3241 382/224 |
| 2007/0097112 A1* | 5/2007 | Greig | ..................... | G01C 11/04 345/419 |
| 2009/0074261 A1* | 3/2009 | Haupt | ................ | G06K 9/00288 382/118 |
| 2010/0067803 A1 | 3/2010 | Huang et al. | | |
| 2011/0291925 A1* | 12/2011 | Israel | ...................... | G06F 3/017 345/157 |
| 2013/0329049 A1* | 12/2013 | Haas | ..................... | B61L 23/042 348/159 |
| 2015/0179219 A1* | 6/2015 | Gao | .................. | G06K 9/00664 386/278 |

OTHER PUBLICATIONS

Improving an Object Detector and Extracting Regions using Superpixels. Guang Shu, Afshin Dehghan, Mubarak Shah. 2013.*
Guang Shu et al, "Improving an Object Detector and Extracting Regions Using Superpixels", CVPR2013 Paper, Conference on Computer Vision and Pattern Recognition, Jun. 2013, pp. 3721-3727, Portland, OR, USA.

* cited by examiner

*Primary Examiner* — Delomia L Gilliard
(74) *Attorney, Agent, or Firm* — Chip Law Group

(57) ABSTRACT

Various aspects of a method and system to track one or more objects in a video stream are disclosed herein. In accordance with an embodiment, the method includes computation of a first confidence score of a first geometrical shape that encompasses at least a portion of an object in a first image frame of the video stream. The first geometrical shape is utilized to track the object in the video stream. The first geometrical shape is split into a plurality of second geometrical shapes. The split of the first geometrical shape is based on a comparison of the computed first confidence score with a pre-defined threshold score.

20 Claims, 6 Drawing Sheets

METHOD AND SYSTEM TO ADAPTIVELY TRACK OBJECTS

FIELD

Various embodiments of the disclosure relate to a method and system to track objects. More specifically, various embodiments of the disclosure relate to a method and system to adaptively track one or more objects in a video stream to handle occlusion.

BACKGROUND

The field of object tracking has gained popularity over the years, due to a plethora of application areas, such as security and surveillance, video communication and compression, augmented reality, traffic control, medical imaging, and/or video editing. To track an object-of-interest in different image frames of a video, a visual object tracking technique may be implemented in an image-processing device, such as a surveillance camera. Existing visual object tracking techniques, such as a template-based tracking technique, utilizes a template of consistent shape and size to track the object-of-interest in different image frames of the video. In certain scenarios, the object-of-interest to be tracked may be occluded by another object (hereinafter, "occluder") in one or more image frames of the video. In such a scenario, the occluder may cause interference to track the object-of-interest. For example, the occluder may cause contamination of the template (usually referred to as tracker contamination) that may lead to an incorrect object to be tracked.

Another group of visual object tracking techniques, such as a conventional fragment-based tracking technique, utilize a pre-determined number of fragments to track object-of-interest and to handle occlusions to a certain extent. However, it may not be desirable to use a pre-determined number of fragments to track the object-of-interest for each image frame of the video. Use of the pre-determined number of fragments may lead to an unnecessary processing load to detect all the fragments in each image frame of the video. An enhanced technique may be required that may adaptively track one or more objects in the video and handle occlusions accurately with optimized utilization of the computational resources.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and system to adaptively track one or more objects substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
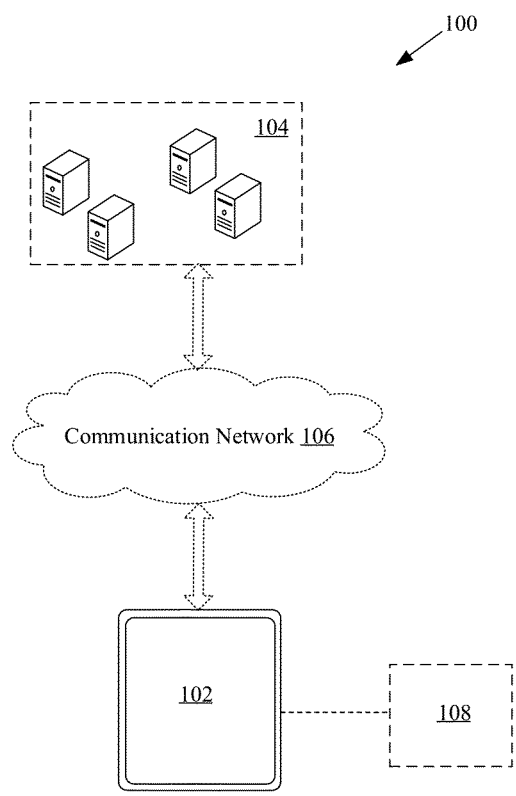
FIG. 1 is a block diagram that illustrates a network environment, in accordance with an embodiment of the disclosure.

The following described implementations may be found in disclosed method and system to adaptively track an object in a video stream. Exemplary aspects of the disclosure may comprise a method that may compute a first confidence score of a first geometrical shape. The first geometrical shape may encompass at least a portion of an object in a first image frame of a video stream. The first geometrical shape may be utilized to track the object in the video stream. The first geometrical shape may be split into a plurality of second geometrical shapes. The first geometrical shape may be split based on a comparison of the computed first confidence score with a pre-defined threshold score.

In accordance with an embodiment, the first geometrical shape that encompasses at least the portion of the object may be generated in an image frame that precedes the first image frame of the video stream. A position of the portion of the object in the first image frame may be detected based on a comparison of the computed first confidence score associated with the first geometrical shape with the pre-defined threshold score.

In accordance with an embodiment, the first confidence score may be computed based on a score surface value. The score surface value may be calculated at a time of search of generated first geometrical shape, which encompasses the portion of the object, in the first image frame.

In accordance with an embodiment, a size value of the first geometrical shape may be utilized for the computation of the first confidence score. In accordance with an embodiment, the computed first confidence score may be directly proportional to the size value of the first geometrical shape.

In accordance with an embodiment, a similarity measure value of the first geometrical shape between the first image frame and an image frame that precedes the first image frame may be utilized for the computation of the first confidence score. The computed first confidence score may be directly proportional to the similarity measure value.

In accordance with an embodiment, the split operation on the first geometrical shape may be performed when the computed first confidence score of the first geometrical shape is less than the pre-defined threshold score. In accordance with an embodiment, the split operation may be performed when a size value of the first geometrical shape is greater than a pre-defined threshold size.

In accordance with an embodiment, a count of the plurality of second geometrical shapes from the split operation may be determined. Such determination of the count is made according to the computed first confidence score of the first geometrical shape.

In accordance with an embodiment, a second confidence score for each of the plurality of second geometrical shapes (from the split operation) may be computed. The portion of the object in the video stream may be tracked by use of the second confidence score of the plurality of second geometrical shapes from the split operation. The second confidence score may be assigned to each of the plurality of second geometrical shapes consequent to the split operation of the first geometrical shape.

In accordance with an embodiment, a plurality of parameters may be calculated for the computation of the second confidence score associated with the plurality of second geometrical shapes. The plurality of parameters may comprise the similarity measure parameter, a relative motion parameter, a relative size parameter, and/or a relative arrangement parameter that are associated with the plurality of second geometrical shapes.

In accordance with an embodiment, each of the calculated plurality of parameters may be associated with a corresponding weight. A weighted summation of the plurality of parameters may be performed for the computation of the second confidence score.

In accordance with an embodiment, two or more of the plurality of second geometrical shapes may be merged. The two or more of the plurality of second geometrical shapes may be merged based on a comparison of the corresponding second confidence score associated with each of the plurality of second geometrical shapes and the pre-defined threshold score. In accordance with an embodiment, the two or more of the plurality of second geometrical shapes may be merged when the second confidence score of each of the two or more of the plurality of second geometrical shapes is same and greater than the pre-defined threshold score.

In accordance with an embodiment, at least the portion of the object may be tracked in a second image frame by use of the merged two or more of the plurality of second geometrical shapes. In accordance with an embodiment, a weight may be determined for each of the plurality of second geometrical shapes. The weight may be determined based on a ratio of the second confidence score associated with corresponding one of the plurality of the second geometrical shapes and a sum of second confidence scores of each of the plurality of second geometrical shapes.

In accordance with an embodiment, the determined weight of each of the plurality of second geometrical shapes may be compared with a pre-defined threshold weight. The comparison may be performed to track the object or the portion of the object in the first image frame and/or the second image frame of the video stream.

In accordance with an embodiment, one or more of the plurality of second geometrical shapes may be eliminated and may not be used for tracking. The elimination of the one or more of the plurality of second geometrical shapes may occur when the determined weight of the one or more of the plurality of second geometrical shapes is below the pre-defined threshold weight.

FIG. 1 is a block diagram that illustrates a network environment, in accordance with an embodiment of the disclosure. With reference to FIG. 1, there is shown a network environment 100. The network environment 100 may include an image-processing device 102, one or more cloud-based resources, such as a server 104, and a communication network 106. There is further shown a video stream 108, associated with the image-processing device 102. The video stream 108 may be captured and/or processed by the image-processing device 102. In accordance with an embodiment, the image-processing device 102 may be communicatively coupled with the server 104, via the communication network 106. In accordance with an embodiment, the image-processing device 102 may not be communicatively coupled with the server 104.

The image-processing device 102 may comprise suitable logic, circuitry, interfaces, and/or code that may be configured to track an object in a plurality of frames of the video stream 108. The object may be tracked based on one or more confidence scores computed by the image-processing device 102. The image-processing device 102 may be configured to process one or more image frames of the video stream 108. Examples of the image-processing device 102 may include, but are not limited to, a camera (such as an action cam, a closed-circuit television (CCTV) camera, and/or other surveillance camera), a camcorder, a smartphone, a wearable device, a tablet computer, and/or a computing device.

The server 104 may comprise suitable logic, circuitry, interfaces, and/or code that may be configured to receive requests from one or more subscribed devices, such as the image-processing device 102. The server 104 may be configured to store information related to a pre-defined threshold score and a pre-defined threshold size. Examples of the server 104 may include, but are not limited to, a web server, a database server, a file server, an application server, or their combination. The server 104 may be implemented by use of several technologies that are well known to those skilled in the art.

The communication network 106 may include a medium through which the image-processing device 102 may communicate with one or more servers, such as the server 104. Examples of the communication network 106 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), 3G, 4G, and/or Bluetooth (BT) communication protocols.

The video stream 108 may comprise a plurality of image frames. The plurality of image frames of the video stream 108 may be processed by the image-processing device 102. In accordance with an embodiment, an object (such as an object-of-interest) to be tracked may be captured by the image-processing device 102 in one or more of the plurality of image frames, and stored as the video stream 108. One or more frames of the plurality of image frames may also comprise another object or a physical entity that partly or completely blocks the view of the object at the time of capture of the plurality of image frames of the video stream 108. Such other object or the physical entity may be referred to as an occluder. Examples of the object to be tracked may include, but are not limited to, a human subject, a group of people, an animal, an article, an item of inventory, a vehicle, and/or other such physical entity. Notwithstanding, the disclosure may not be so limited and any other living and/or non-living thing may be tracked without limitation to the scope of the disclosure.

In operation, the image-processing device 102 may be configured to generate a first geometrical shape. The first geometrical shape may encompass at least a portion of the object in an image frame of the video stream 108. For example, when the object to be tracked is a human subject, the first geometrical shape may encompass a face, a torso, or the entire body of the human subject. The generated first geometrical shape may be utilized to track the object in subsequent image frames of the video stream 108, as described below.

In accordance with an embodiment, the first image frame may refer to an image frame that may be next to the image frame associated with the generation of the first geometrical shape. The image-processing device 102 may search by use of the generated first geometrical shape. In accordance with an embodiment, the image-processing device 102 may be configured to calculate a score surface value, based on degree of similarity between the first image frame and the image frame that precedes the first image frame. For instance, the image frame associated with the generation of the first geometrical shape may correspond to the preceding image frame, as described above. The score surface value may be calculated at a time of the search of the generated first geometrical shape in the first image frame. The score surface value may be calculated to aid in the computation of a first confidence score of the first geometrical shape in the first image frame.

In accordance with an embodiment, the image-processing device 102 may be configured to compute the first confidence score of the first geometrical shape (that encompasses the portion of the object) in the first image frame of the video stream 108. In accordance with an embodiment, the image-processing device 102 may be configured to further utilize a size value of the first geometrical shape for the computation of the first confidence score. The computed first confidence score may be directly proportional to the size value of the first geometrical shape.

In accordance with an embodiment, the image-processing device 102 may further utilize a similarity measure value of the first geometrical shape between two image frames, such as the first image frame and the image frame that precedes the first image frame. The similarity measure value is used for the computation of the first confidence score. The computed first confidence score may be directly proportional to the similarity measure value.

In accordance with an embodiment, the image-processing device 102 may be configured to compare the computed first confidence score of the first geometrical shape with a pre-defined threshold score. In instances when the computed first confidence score of the first geometrical shape is above the pre-defined threshold score, the image-processing device 102 may be configured to detect a position of the portion of the object in the first image frame. The position of the portion of the object may be detected in the first image frame by use of the first geometrical shape based on the comparison of the computed first confidence score with the pre-defined threshold score. Such detection may occur to track the object in the first image frame as it compares to a preceding image frame, such as the image frame associated with the generation of the first geometrical shape, as described above.

In instances when the computed first confidence score of the first geometrical shape is less than the pre-defined threshold score, the image-processing device 102 may be configured to split the first geometrical shape into a plurality of second geometrical shapes. In accordance with an embodiment, the first geometrical shape may be split when a size value of the first geometrical shape is greater than a pre-defined threshold size.

In accordance with an embodiment, a count of the plurality of second geometrical shapes may be pre-determined to accomplish the split operation. The determination of the count may be based on the computed first confidence score of the first geometrical shape. For example, when two second geometrical shapes are sufficient to track the object, the first geometrical shape may be split into two second geometrical shapes, based on the first confidence score of the first geometrical shape. In instances when the two second geometrical shapes are not sufficient to track the object, the first geometrical shape may be split into three second geometrical shapes. Optimum resource utilization may be achieved as the count is set to a minimum number by use of which the object can be accurately tracked.

In accordance with an embodiment, the image-processing device 102 may be configured to compute a second confidence score for each of the plurality of second geometrical shapes for the tracking of the portion of the object in the video stream 108. The image-processing device 102 may be configured to assign the second confidence score to each of the plurality of second geometrical shapes.

In accordance with an embodiment, the image-processing device 102 may be configured to calculate and utilize a plurality of parameters for the computation of the second confidence score associated with the plurality of second geometrical shapes. The plurality of parameters may comprise a similarity measure parameter, a relative motion parameter, a relative size parameter, and/or a relative arrangement parameter that are associated with the plurality of second geometrical shapes. The plurality of parameters for the computation of the second confidence score are described in detail in FIG. 2.

In accordance with an embodiment, each of the calculated plurality of parameters may have a corresponding weight. The image-processing device 102 may be configured to perform a weighted summation of the plurality of parameters for the computation of the second confidence score. The image-processing device 102 may be configured to perform a comparison of a second confidence score associated with a second geometrical shape (of the plurality of second geometrical shapes) with the pre-defined threshold score.

In accordance with an embodiment, the image-processing device 102 may then detect or track a position of the portion of the object in the first image frame by use of the plurality of second geometrical shapes. The computed second confidence score associated with each of the plurality of the geometrical shapes, may be utilized for the detection of the portion of the object in the first image frame in a simplified manner. For example, in a scenario when the computed first confidence score of the first geometrical shape is less than the pre-defined threshold score, a difficulty to track the portion of the object in the first image is indicated by use of the first geometrical shape. Thus, the split operation of the first geometrical shape occurs dynamically to adaptively track at least the portion of the object in the first image frame, for the scenario.

In certain instances, the entirety of the plurality of the second geometrical shapes may not be required to track the portion of the object in successive image frames, such as a second image frame, of the video stream 108. In such instances, the image-processing device 102 may be configured to merge two or more of the plurality of second geometrical shapes to track more effectively. In accordance with an embodiment, the image-processing device 102 may be configured to merge two or more of the plurality of second geometrical shapes based on the comparison of the second confidence score associated with each of the plurality of second geometrical shapes with the pre-defined threshold score. In accordance with an embodiment, the image-processing device 102 may be configured to merge the two or more of the plurality of second geometrical shapes when the second confidence score of each of the two or more of the plurality of second geometrical shapes is same and greater than the pre-defined threshold score.

In accordance with an embodiment of the disclosure, the image-processing device 102 may be configured to track at least the portion of the object in the second image frame by use of the merged two or more of the plurality of second geometrical shapes. The image-processing device 102 may be configured to determine a cumulative weight for each of the plurality of second geometrical shapes.

In accordance with an embodiment, the image-processing device 102 may be configured to perform a comparison of the determined weight of each of the plurality of second geometrical shapes with a pre-defined threshold weight. The image-processing device 102 may be configured to eliminate one or more of the plurality of second geometrical shapes. The eliminated one or more of the plurality of second geometrical shapes may not be included to track the portion of the object in successive image frames of the video stream 108. The one or more of the plurality of second geometrical shapes are eliminated when the determined weight of the one or more of the plurality of second geometrical shapes is below the pre-defined threshold weight. The elimination operation may free up the computational resources that could have been unnecessarily utilized by the two or more second geometrical shapes before the merge operation.

In an exemplary aspect of the disclosure, the above operations may be performed in association with the server 104, as described below. In accordance with an embodiment, instead of the image-processing device 102, the computation of the first confidence score, the computation of the second confidence scores, and/or one or more other operations as described above may be performed at the server 104. In such a case, the image-processing device 102 may be configured to communicate a first request to the server 104, via the communication network 106.

In accordance with an embodiment, the first request may include the plurality of images of the video stream 108. The first confidence score of the first geometrical shape may be computed by the server 104. The image-processing device 102 may be configured to receive the first confidence score from the server 104. In accordance with an embodiment, the second confidence score of the plurality of second geometrical shapes may also be computed by the server 104. The image-processing device 102 may be configured to receive the second confidence score of the plurality of second geometrical shapes from the server 104.

In accordance with an embodiment, the first request may include the first confidence score of the first geometrical shape. In such a case, the first confidence score is computed at the image-processing device 102. The request may be communicated to retrieve a comparison result between the first confidence score of the first geometrical shape and the pre-defined threshold score that may be stored at the server 104.

The server 104 may be configured to perform the comparison of the first confidence score associated with the first geometrical shape received from the image-processing device 102 with the pre-defined first confidence score. The server 104 may be configured to communicate the comparison result to the image-processing device 102, via the communication network 106. The image-processing device 102 may be configured to detect the position of at least the portion of the object in the first image frame based on the received comparison result received from the server 104.

In accordance with an embodiment, the image-processing device 102 may be configured to communicate a second request to the server 104, via the communication network 106. In such a case, the second request may include the second confidence score of each of the plurality of second geometrical shapes computed at the image-processing device 102. The second request may be communicated to retrieve a comparison result between the second confidence score associated with each of the plurality of second geometrical shapes and the pre-defined threshold score that may be stored at the server 104.

In accordance with an embodiment, the server 104 may be configured to perform the comparison of the corresponding second confidence score associated with each of the plurality of second geometrical shapes with the pre-defined first confidence score. The server 104 may be configured to communicate the comparison result to the image-processing device 102, via the communication network 106. The image-processing device 102 may be configured to merge two or more of the plurality of second geometrical shapes based on the received comparison result related to the second confidence score associated with each of the plurality of second geometrical shapes.

In accordance with an embodiment, the split operation of the first geometrical shape and/or the merge operation of the two or more second geometrical shapes may be performed by the server 104, without limiting the scope of the disclosure. In such an embodiment, the image-processing device 102 may be configured to receive the results of the split operation and/or merge operation from the server 104.

Figure 2:
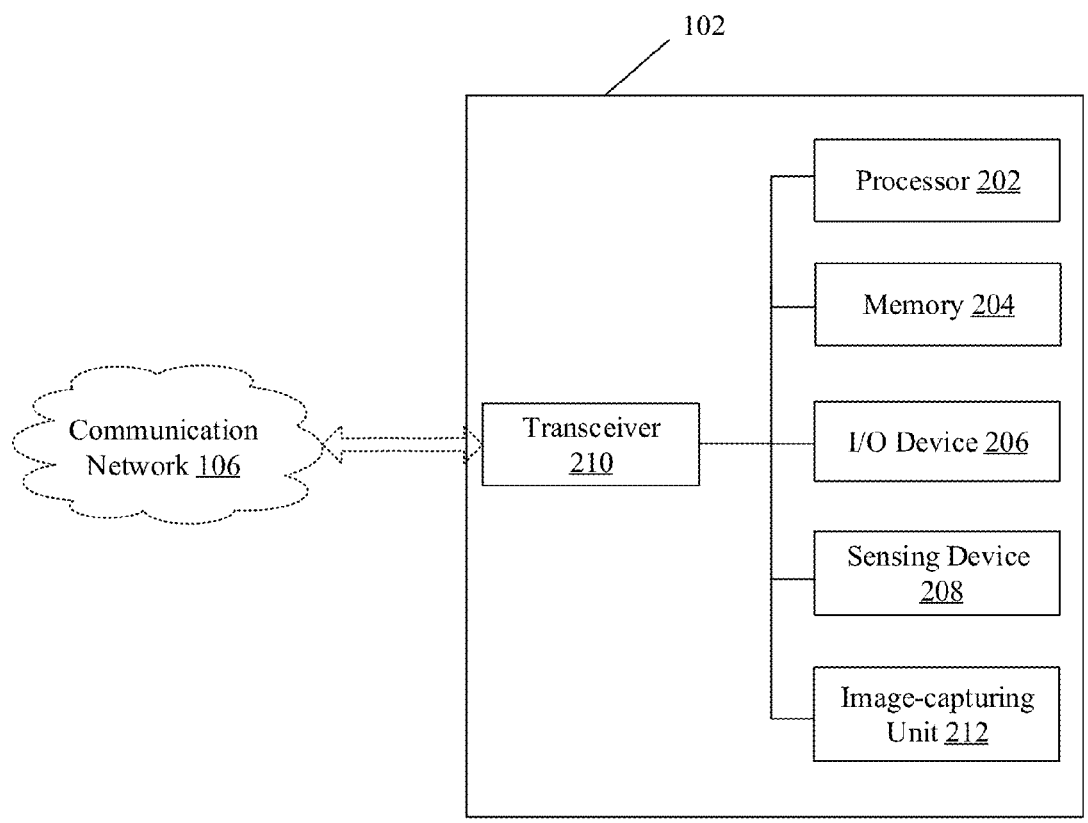
FIG. 2 is a block diagram that illustrates an exemplary image-processing device, in accordance with an embodiment of the disclosure.

FIG. 2 is a block diagram that illustrates an exemplary image-processing device, in accordance with an embodiment of the disclosure. FIG. 2 is explained in conjunction with elements from FIG. 1. With reference to FIG. 2, there is shown the image-processing device 102. The image-processing device 102 may comprise one or more processors, such as a processor 202, a memory 204, one or more input/output (I/O) devices, such as an I/O device 206, one or more sensing devices, such as a sensing device 208, a transceiver 210, and an image-capturing unit 212. There is further shown the communication network 106 of FIG. 1.

The processor 202 may be communicatively coupled to the memory 204, the I/O device 206, the sensing device 208, the transceiver 210, and the image-capturing unit 212. The transceiver 210 may be configured to communicate with one or more servers, such as the server 104, via the communication network 106.

The processor 202 may comprise suitable logic, circuitry, interfaces, and/or code that may be configured to execute a set of instructions stored in the memory 204. The processor 202 may be implemented based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 204 may comprise suitable logic, circuitry, and/or interfaces that may be configured to store a machine code and/or a set of instructions executable by the processor 202. The memory 204 may be configured to store information related to the pre-defined threshold score and the pre-defined threshold size. The stored information may be utilized to track one or more objects, as described in the latter part of the disclosure. The memory 204 may be configured to store configuration settings of the image-processing device 102 and the sensing device 208. The memory 204 may further be configured to store data associated with different objects to be tracked, such as data of size, shape, frequency of the same object being tracked. The memory 204 may comprise one or more image buffers or a circular image buffer to process and/or store one or more images tracked or captured by the image-processing device 102. The memory 204 may further store one or more image tracking algorithms, one or more image-processing algorithms, and/or other data. The memory 204 may be further configured to store operating systems and associated applications. Examples of implementation of the memory 204 may include, but are not limited to, a Random Access Memory (RAM), a Read Only Memory (ROM), an Electrically Erasable Programmable Read-Only Memory (EEPROM), a Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to control presentation of the tracked object on a display (not shown). The display may correspond to the display of the image-processing device 102 or an electronic device that may be communicatively coupled to the image-processing device 102. The I/O device 206 may comprise various input and output devices that may be configured to communicate with the processor 202. Examples of the input devices or input mechanisms may include, but are not limited to, a shutter button, a record button on the image-processing device 102 (such as a camera), a software button on a UI of the image-processing device 102, the image-capturing unit 212, a touch screen, a microphone, a motion sensor, and/or a light sensor. Examples of the output devices may include, but are not limited to, the display, a projector screen, and/or a speaker.

The sensing device 208 may refer to one or more sensors that may be configured to receive an input to adjust position of the image-processing device 102. The position of the image-processing device 102 may be adjusted to suitably capture the video stream 108. The sensing device 208 may further comprise one or more sensors to aid in capture of one or more scenes, such as images and/or videos. Examples of the one or more sensors may include, but are not limited to, an accelerometer, a global positioning system (GPS) sensor, a compass or magnetometer, an ambient light sensor, a tricorder, a gyroscope, a proximity sensor, an image sensor, a lux meter, a touch sensor, an infrared sensor, and/or other sensors.

The transceiver 210 may comprise suitable logic, circuitry, interfaces, and/or code that may be configured to communicate with one or more servers, such as the server 104, via the communication network 106 (as shown in FIG. 1). The transceiver 210 may implement known technologies to support wired or wireless communication of the image-processing device 102 with the communication network 106. Components of the transceiver 210 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 210 may communicate, via wireless communication, with the communication network 106. The wireless communication may use one or more communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The image-capturing unit 212 may comprise suitable logic, circuitry, interfaces, and/or code that may be configured to capture one or more objects in the plurality of image frames of the video stream 108. The image-capturing unit 212 may refer to an in-built camera or an image sensor of the image-processing device 102. The image-capturing unit 212 may comprise a viewfinder that may be configured to compose and/or focus the view captured by the image-capturing unit 212. The image-capturing unit 212 may be configured to store the captured plurality of images of the video stream 108 in a local buffer and/or the memory 204.

In operation, the image-capturing unit 212 may be configured to capture the plurality of image frames as the video stream 108. The processor 202 may be configured to generate a first geometrical shape to encompass at least a portion of the object in an image frame of the video stream 108. Various types of information associated with the generated first geometrical shape may be stored in the memory 204. For example, the generated first geometrical shape may be a triangle, a quadrilateral (such as a rectangle), and/or a polygon. The polygon may be a regular or an irregular polygon. The dimension, size and shape information of the first geometrical shape may be stored in the memory 204 for later use. The first geometrical shape may be generated based on the type and shape of the object to be tracked. The processor 202 may then track the object in subsequent image frames, such as the first image frame, of the video stream 108, as described below.

In accordance with an embodiment, the tracking may begin automatically when the object that is to be tracked is detected by the sensing device 208 or the image-capturing unit 212. In accordance with an embodiment, the processor 202 may be configured to receive an input to launch an object-tracking application, pre-stored in the memory 204. The object tracking operation may begin based on the user input. The processor 202 may be configured to track the object in the plurality of image frames of the video stream 108.

In accordance with an embodiment, the processor 202 may be configured to search at least the portion of the object in the first image frame by use of the generated first geometrical shape. In accordance with an embodiment, the processor 202 may be configured to search for the object in the first image frame of the video stream 108, based on previous learning related to the object. For example, the processor 202 may learn various texture features of the object by use of one or more representations, such as histograms, templates, Local binary patterns (LBP), Histogram of Oriented Gradients (HOG), and/or Haar-like feature representations.

In accordance with an embodiment, the processor 202 may use one or more search strategies to search for the object in the image frames, such as the first image frame. Examples of such one or more search strategies may include, but are not limited to, mean-shift searching, normalized cross-correlation searching, and/or sliding window classifier score maximization searching. The processor 202 may use one or more motion models to represent motion model of the object in the plurality of the image frames of the video stream 108. Examples of such one or more motion models may include, but are not limited to, Brownian motion, constant velocity, and/or constant acceleration models.

In accordance with an embodiment, the processor 202 may be configured to calculate a score-surface value based on a similarity measure between the first image frame and the image frame that precedes the first image frame. The similarity measure may correspond to the determination of cross-correlation, normalized cross-correlation, or mutual information between two image frames, such as the first image frame and the image frame that precedes the first image frame. For instance, the image frame associated with the generation of the first geometrical shape may correspond to the preceding image frame, as described above. The score surface value may be calculated at a time of the search of the generated first geometrical shape in the search region of the first image frame.

In accordance with an embodiment, the similarity measure parameter may be determined by various techniques such as the cross-correlation or the normalized cross-correlation, as described above. In an instance, the similarity measure parameter may be determined by using peak-to-side lobe ratio. The similarity measure may provide an estimation of the peak-to-side lobe ratio in a search region. A high or distinct peak value may refer to a high possibility to track the object. A low peak value may refer to a possible occlusion at the time of tracking, such as a time when tracking is performed in the first image frame. The variation of the side lobes from the peak may be measured as the similarity measure parameter. A value of the peak subtracted by a mean value of the side lobes, and the resultant value divided by a standard deviation of the at least one side lobe, may provide the peak-to-side lobe ratio, as known in the art.

In accordance with an embodiment, the processor 202 may be configured to compute the first confidence score of the first geometrical shape (that encompasses the portion of the object) in the first image frame of the video stream 108. In accordance with an embodiment, the processor 202 may be configured to further utilize size value of the first geometrical shape for the computation of the first confidence score. The computed first confidence score may be directly proportional to the size value of the first geometrical shape. The processor 202 may further utilize the similarity measure value of the first geometrical shape between two image frames, such as the first image frame and the image frame that precedes the first image frame. This may be done for the computation of the first confidence score (as described above). The computed first confidence score may be directly proportional to the similarity measure value.

In accordance with an embodiment, the processor 202 may be configured to compare the computed first confidence score of the first geometrical shape with a pre-defined threshold score. In accordance with an embodiment, the pre-defined threshold score may be pre-stored in the memory 204.

In instances when the computed first confidence score of the first geometrical shape is above the pre-defined threshold score, the processor 202 may be configured to detect a position of the portion of the object in the first image frame. The position of the portion of the object may be detected in the first image frame by use of the first geometrical shape. The detection may be based on the comparison of the computed first confidence score with the pre-defined threshold score. Such detection may occur to track the object in the first image frame from a preceding image frame, such as the image frame associated with the generation of the first geometrical shape, as described above.

In instances when the computed first confidence score of the first geometrical shape is less than the pre-defined threshold score, the processor 202 may be configured to split the first geometrical shape into a plurality of second geometrical shapes. In accordance with an embodiment, the first geometrical shape may be split when size value of the first geometrical shape is greater than a pre-defined threshold size.

In accordance with an embodiment, a count of the plurality of second geometrical shapes may be pre-determined to accomplish the split operation. The determination of the count may be based on the computed first confidence score of the first geometrical shape. In accordance with an embodiment, the generated plurality of second geometrical shapes may be similar in shape and size. Conversely, in accordance with an embodiment, the plurality of second geometrical shapes may not be similar in shape and size. The plurality of second geometrical shapes may refer to multiple other geometrical shapes obtained from the split of the first geometrical shape.

In accordance with an embodiment, the shape and/or size of the second geometrical shape may be determined based on a portion of the object which is encompassed. For example, when the object to be tracked is a human subject, a second geometrical shape that encompasses a face of the person may be smaller in size to another second geometrical shape that encompasses the torso of the human subject. Further, the second geometrical shape that encompasses the face of the human subject may be oval in shape and the second geometrical shape that encompasses the torso of the human subject person may be rectangular in shape. In accordance with an embodiment, geometry of the generated plurality of second geometrical shapes may be predefined. In accordance with an embodiment, geometry of the second geometrical shapes may be adaptively determined, based on type of the object or the portion of the object that is encompassed, as described above.

In accordance with an embodiment, the processor 202 may be configured to compute a second confidence score for each of the plurality of second geometrical shapes, to track the portion of the object in the video stream 108. The image-processing device 102 may be configured to assign the second confidence score to each of the plurality of second geometrical shapes. In accordance with an embodiment, the second confidence score may be assigned subsequent to the split operation of the first geometrical shape.

In accordance with an embodiment, the processor 202 may be configured to calculate and utilize a plurality of parameters for the computation of the second confidence score, associated with the plurality of second geometrical shapes. The plurality of parameters may comprise a similarity measure (as previously described), relative motion, relative size, and/or relative arrangement parameters associated with the plurality of second geometrical shapes. In accordance with an embodiment, the second confidence score may be directly proportional to the similarity measure parameter.

The relative motion parameter may refer to motion consistency of second geometrical shape. The relative motion parameter may indicate how similar the motion of a second geometrical shape is with respect to the motion of another of the plurality of second geometrical shapes. The relative motion parameter of second geometrical shape may be represented as "motion value", in accordance with equation (1):

Relative motion parameter (motion value) = (1)

$$\frac{\sqrt{(\Delta x_i - \Delta \tilde{x})^2 + (\Delta y_i - \Delta \tilde{y})^2}}{\sqrt{\Delta \tilde{x}^2 + \Delta \tilde{y}^2}}$$

where "($\Delta x_i$, $\Delta y_i$)" is a vector quantity that denotes the motion of each of the second geometrical shapes, "i", and "($\Delta \tilde{x}$, $\Delta \tilde{y}$)" denotes a median of the motion of the plurality of second geometrical shapes in the directions, "x" and "y", respectively.

The above equation (1) may determine how far the motion vector of a given second geometrical shape is with respect to the median motion of the plurality of second geometrical shapes in an image frame (motion being the change in the location indicated by a second geometrical shape). In accordance with an embodiment, the second confidence score may be directly proportional to the similarity measure parameter.

The relative size parameter of a second geometrical shape may be a measure of how similar the size of the second geometrical shape is with respect to the size of a second geometrical shape of the plurality of second geometrical shapes. The relative size parameter may be the ratio of the size of one of the determined plurality of second geometrical shapes with respect to the average size of the plurality of second geometrical shapes in an image frame of the video stream 108. The relative size parameter of the second geometrical shape may be represented as "size value", in accordance with equation (2):

$$\text{Relative size parameter (size value)} = \frac{S_i}{S} \quad (2)$$

where "$S_i$" denotes size of the second geometrical shape, denoted by "i", and "S" denotes the average size of the plurality of second geometrical shapes.

Notwithstanding, the disclosure may not be so limited and parameters used for computation of the confidence scores may comprise other parameters as well without limiting the scope of the disclosure. For example, the plurality of parameters may comprise the relative arrangement parameter. The relative arrangement parameter of a second geometrical shape may be determined based on an arrangement or agreement of the second geometrical shape with respect to the other neighboring second geometrical shapes. The plurality of parameters may also comprise an additional parameter which may account for past instances of confidence scores of each the second geometrical shape in different image frames.

In accordance with an embodiment, each of the plurality of parameters may be associated with a weight. The image-processing device 102 may be configured to perform a weighted summation of the plurality of parameters for the computation of the second confidence score. Equation (3), as given below, depicts a relation between the second confidence score of each of the plurality of second geometrical shapes, and the plurality of parameters used in the computation of the second confidence score. The following equation (3) includes at least the three parameters of the plurality of the parameters, as described above. The second confidence score of each of the plurality of second geometrical shapes may be represented in accordance with equation (3):

$$C_i = A \times (\text{Similarity value}) + B \times (\text{Motion value}) + C \times (\text{Size value}) \quad (3)$$

where "$C_i$" is the second confidence score of the second geometrical shape "i" (i=1 to n). "A", "B", and "C" are weights associated with the respective parameters. These weights may determine the importance of each of the plurality of parameters in the computation of the second confidence score of the second geometrical shape in a given image frame of the video stream 108.

The processor 202 may be configured to perform a comparison of the second confidence score associated with a corresponding second geometrical shape (of the plurality of second geometrical shapes) with the pre-defined threshold score. In accordance with an embodiment, the processor 202 may then detect or track a position of the portion of the object in the first image frame by use of the plurality of second geometrical shapes. The computed second confidence score associated with each of the plurality of second geometrical shapes, may be utilized for the detection of the portion of the object in the first image frame in a simplified manner. For example, the pre-defined threshold score may be a numeric value "6", while the computed first confidence score of the first geometrical shape may be a numeric value "4". When the computed first confidence score "4" is less than the pre-defined threshold score "6", a difficulty to track the portion of the object in the first image is indicated by use of the first geometrical shape. Thus, the split operation of the first geometrical shape occurs dynamically to adaptively track at least the portion of the object in the first image frame, as in the above example.

In instances where the entirety of the plurality of the geometrical shapes may not be required to track the portion of the object in subsequent image frames, such as a second image frame, the processor 202 may be configured to merge two or more of the plurality of second geometrical shapes while tracking. In accordance with an embodiment, the processor 202 may be configured to merge two or more of the plurality of second geometrical shapes, based on the comparison of the corresponding second confidence scores associated with each of the plurality of second geometrical shapes with the pre-defined threshold score.

In accordance with an embodiment, the processor 202 may be configured to merge two or more of the plurality of second geometrical shapes when the second confidence score of each of the two or more of the plurality of second geometrical shapes is same and greater than the pre-defined threshold score. For example, five second geometrical shapes and associated second confidence scores may be as given in the following table 1.

TABLE 1

| Second geometrical shapes | Second confidence scores |
|---|---|
| SG-1 | 2 |
| SG-2 | 7 |
| SG-3 | 7 |
| SG-4 | 8 |
| SG-5 | 9 |

In the above table 1, the second confidence scores of the two second geometrical shapes, such as "SG-2" and "SG-3", of the plurality of second geometrical shapes, such as "SG-1" to "SG-5", are the same, such as "7" and greater than the pre-defined threshold score, such as "5". Thus, the two second geometrical shapes, such as "SG-2" and "SG-3", may be merged to track the portion of the object in successive image frames, such as the second image frame.

In accordance with an embodiment, the processor 202 may be configured to track at least the portion of the object in the second image frame, by use of the merged two or more of the plurality of second geometrical shapes. The processor 202 may be configured to determine a weight for each of the plurality of second geometrical shapes. The weight may be based on a ratio of the second confidence score associated with corresponding one of the plurality of the second geometrical shapes and a sum of second confidence scores of each of the plurality of second geometrical shapes. The weight of each of the plurality of second geometrical shapes may be determined, in accordance with equation (4).

$$W_i = C_i/C_t \qquad (4)$$

where "$W_i$" is the weight determined for each second geometrical shape "i", "$C_i$" is the second confidence score of the second geometrical shape "i", and "$C_t$" is a total confidence score. The total confidence score is the sum of second confidence scores of the second geometrical shapes (of the plurality of the second geometrical shapes). A cumulative weight of each of the plurality of second geometrical shapes may be determined, based on the weight, as determined in the equation (4).

In accordance with an embodiment, the processor 202 may be configured to perform a comparison of the cumulative weight of each of the plurality of second geometrical shapes with the pre-defined threshold score. The image-processing device 102 may be configured to eliminate use of one or more of the plurality of second geometrical shapes, such as "SG-1", that had been used to track the object or at least the portion of the object. Such an operation may occur when the determined cumulative weight, such as "2/33", is below the pre-defined threshold weight, such as "6". This operation may make the computational resources available that could have been unnecessary utilized by the two or more second geometrical shapes before the merge operation. Thus, tremendous optimization of computational resources may be achieved as track operation is performed for multiple image frames of the video stream 108.

Figure 3:
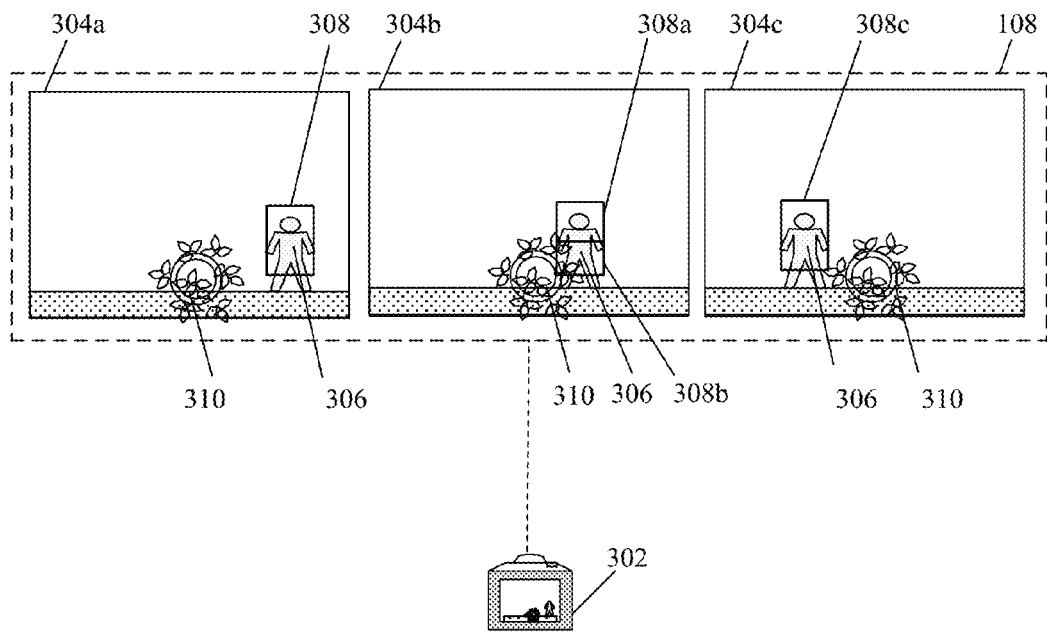
FIG. 3 illustrates a first exemplary scenario for implementation of the disclosed method and system to track one or more objects, in accordance with an embodiment of the disclosure.

FIG. 3 illustrates a first exemplary scenario for the implementation of the disclosed method and system to track one or more objects in a video stream, in accordance with an embodiment of the disclosure. FIG. 3 is explained in conjunction with elements from FIG. 1 and FIG. 2. With reference to FIG. 3, there is shown a camera 302, geometrical shapes 308, 308a, 308b, and 308c, and the video stream 108, processed by the camera 302. For brevity, three consecutive image frames 304a, 304b, and 304c, of the plurality of the image frames, are shown in the video stream 108. There is further shown captured views of a real-world scene in the three consecutive image frames 304a, 304b, and 304c, which include an object 306 to be tracked, such as a human subject (as shown), and another object, such as a plant 310. In the image frame 304a of the video stream 108, the object 306 is shown to move towards the plant 310. In the image frame 304b of the video stream 108, the object 306 is shown to be occluded by the plant 310. The plant 310 may be referred to as the occluder as it partly occludes the object 306 in certain image frames, such as the image frame 304b. In the image frame 304c of the video stream 108, the object 306 is shown to move past the plant 310.

In accordance with the first exemplary scenario, the camera 302 may have functionalities similar to that of the image-processing device 102. The camera 302 may capture the plurality of image frames, such as the three consecutive image frames 304a, 304b and 304c, of the video stream 108. It may be desirable to track the object 306 in the plurality of image frames, such as the three consecutive image frames 304a, 304b, and 304c. The object 306 to be tracked may be in motion and the occluder, such as the plant 310, may be static.

It may be difficult to track the object 306 in the consecutive image frames, such as the image frame 304b, because of partial occlusion of the object 306 by the plant 310, as shown in the image frame 304b. The geometrical shape 308 may correspond to the first geometrical shape, the geometrical shapes 308a and 308b may correspond to the plurality of second geometrical shapes, as described previously in FIGS. 1 and 2. In the image frame 304c of the video stream 108, the object 306 is shown to move past the plant 310.

In operation, the camera 302 may be configured to generate the geometrical shape 308 in the image frame 304a. The geometrical shape 308 is generated to encompass the face and the torso of the object 306. The object 306 may be adaptively and accurately tracked in the three consecutive image frames 304a, 304b, and 304c, as described below.

In accordance with an embodiment, the camera 302 may be configured to compute confidence score of the geometrical shape 308 in the image frame 304b. The computed confidence score may correspond to the first confidence score. For the computation of the confidence score, the camera 302 may be configured to utilize the score surface value, the size value and/or the similarity measure (as described in detail in FIG. 2) of the geometrical shape 308.

In accordance with an embodiment, the camera 302 may be configured to compare the computed confidence score, such as "2" of the geometrical shape 308, by use of a pre-defined threshold score, such as "6". In accordance with the first exemplary scenario, the confidence score of the geometrical shape 308 may be less than the pre-defined confidence score. Based on the comparison result, the camera 302 may be configured to split the geometrical shape 308 into two other geometrical shapes, such as the geometrical shapes, 308a and 308b. The geometrical shapes 308a and 308b may correspond to the plurality of second geometrical shapes (as described in FIGS. 1 and 2). The split of the geometrical shape 308 into a certain number, such as two geometrical shapes 308a and 308b in this case, may be determined based on the computed confidence score. The camera 302 may be further configured to compute the second confidence score of each of the geometrical shapes 308a and 308b. For the computation of the second confidence score of the geometrical shapes 308a and 308b, the camera 302 may be configured to utilize the plurality of parameters as described in detail in FIG. 2, and perform a weighed summation (based on equation (3) (FIG. 2)) of the plurality of parameters.

In accordance with an embodiment, the camera 302 may be configured to assign the computed second confidence scores to each of the geometrical shapes 308a and 308b. For example, the geometrical shape 308a may be assigned the computed confidence score, such as "9", calculated based on the equation (3). Similarly, the geometrical shape 308b may be assigned a confidence score, such as "4", calculated based on the equation (3) as the second confidence score. The confidence score "4" may denote occlusion of the torso portion of the object 306, such as a human subject, by the plant 310. The object 306 and/or at least the portion of the object 306 encompassed by the geometrical shape 308a, may be tracked in the image frame 304b, by use of the geometrical shape 308a. The dynamic split operation avoids contamination of the initial tracker, such as the geometrical shape 308, due to the occlusion, at the time of search and/or detection of the object 306 in the image frame 304b.

In accordance with an embodiment, the camera 302 may be configured to determine a weight for each of the second geometrical shapes, such as the geometrical shapes 308a and 308b. For example, the weight of the geometrical shapes 308a may be "0.69" that is ratio of the confidence score "9" and a sum of the second confidence scores, such as the sum "13", of the confidence scores "4" and "9". Similarly, the weight of the geometrical shapes 308b may be "0.30" (calculated based on the expression "4/13"). The final position of the object 306 in the image frames 304b and 304c may be tracked from the weighted location of the geometrical shapes 308a, as described above.

Further, in certain instances, the geometrical shapes 308a and 308b may be used to detect or track the object 306 in the successive image frame, such as the image frame 304c. In such instances, the camera 302 may further compute the confidence scores of the geometrical shapes 308a and 308b in the image frame 304c. For example, a confidence score "8" may be computed for both the geometrical shapes 308a and 308b in the image frame 304c. In such instances, when the confidence score of each of the geometrical shapes 308a and 308b is same and greater than the pre-defined threshold score, such as "6", the camera 302 may be configured to merge the geometrical shapes 308a and 308b into the geometrical shape 308c. The geometrical shape 308c, in the image frame 304c, may encompass the face and the torso of the object 306, as shown. The camera 302 may be configured to track the object 306, based on the merged geometrical shape, such as the geometrical shape 308c. Thus, as described above, the split and the merge techniques are adaptive and alleviate utilization of computational resources by creating geometrical shapes only when needed, and is thus more suitable for hardware implementation and effective tracking of one or more objects. The first exemplary scenario explained above illustrates a scenario in which the object to be tracked is in motion while the occluder is static. However, without limitation to the scope of the disclosure, in other scenarios, tracking may occur even when the occluder moves, as described below in FIG. 4.

Figure 4:
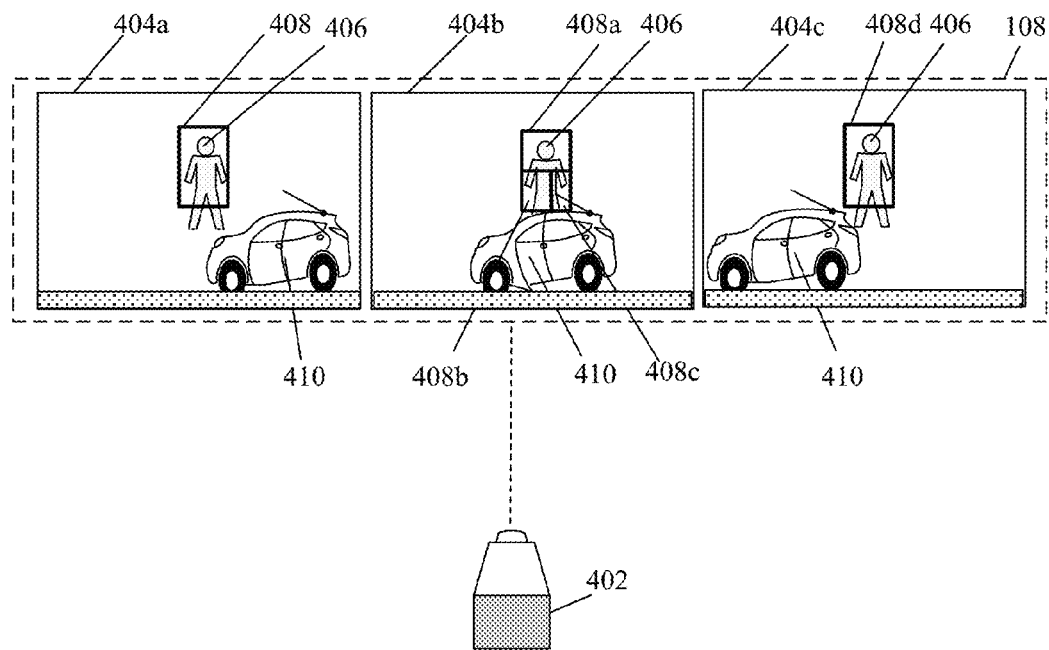
FIG. 4 illustrates a second exemplary scenario for implementation of the disclosed method and system to track one or more objects, in accordance with an embodiment of the disclosure.

FIG. 4 illustrates a second exemplary scenario for the implementation of the disclosed method and system to track one or more objects in a video stream, in accordance with an embodiment of the disclosure. FIG. 4 is explained in conjunction with elements from FIG. 1 and FIG. 2. With reference to FIG. 4, there is shown a CCTV camera 402, geometrical shapes 408, 408a, 408b, and 408c, and the video stream 108 processed by the CCTV camera 402. For brevity, three consecutive image frames 404a, 404b, and 404c, of the plurality of the image frames, are shown in the video stream 108. There is further shown captured views of a real-world scene in the three consecutive image frames 404a, 404b, and 404c. The captured views include an object 406 to be tracked, such as a static human subject (as shown), another object in motion, such as a car 410. The car 410 in this case may be referred to as the occluder as it partly occludes the object 406 in certain image frames, such as the image frame 404b.

In accordance with the second exemplary scenario, the CCTV camera 402 may have functionalities similar to that of the image-processing device 102. The CCTV camera 402 may capture the plurality of image frames, such as the three consecutive image frames 404a, 404b and 404c of the video stream 108. The object 406 to be tracked may be static and the occluder, such as the car 410, may be in motion. It may be difficult to track the object 406 in the consecutive image frames, such as the image frame 404b, due to partial occlusion of the object 406 by a car that is in motion (as shown in the image frame 404b). The geometrical shape 408 may correspond to the first geometrical shape, the geometrical shapes 408a and 408b may correspond to the plurality of second geometrical shapes, as described previously in FIGS. 1 and 2. In the image frame 404a of the video stream 108, the car 410 is shown to move towards the object 406 that is to be tracked. Notwithstanding, the disclosure may not be so limited and any other object instead of the human subject can be tracked in the plurality of image frames without limitation to the scope of the disclosure.

In operation, the CCTV camera 402 may be configured to generate the geometrical shape 408 in the image frame 404a. The generated geometrical shape 408 may encompass the face and the torso of the object 406. The object 406 may be adaptively and accurately tracked in the three image frames 404a, 404b, and 404c, as described below.

In accordance with the second exemplary scenario, the image frame 404b is shown such that the car 410 partly occludes the object 406. The CCTV camera 402 may be configured to compute a first confidence score of the geometrical shape 408 in the first image frame, such as the image frame 404b. For the computation of the first confidence score, the CCTV camera 402 may be configured to utilize the score surface value, the size value and/or the similarity measure a size value and a similarity value of first geometrical shape, such as the geometrical shape 408, as described in detail in FIG. 2.

In accordance with the second exemplary scenario, the first confidence score, such as "3", of the geometrical shape 408, may be less than the pre-defined confidence score, such as "6". The CCTV camera 402 may be configured to split the geometrical shape 408 into three different geometrical shapes 408a, 408b, and 408c of different sizes. The split may be based on the computed first confidence score. In accordance with an embodiment, the split may occur not only to handle occlusion, but also to handle any other tracking difficulty of a certain portion of an object, such as the object 406 encompassed by the geometrical shape 408. Examples of tracking difficulty issues may include, but are not limited to, occlusion issues, deformation issues, and/or an appearance change related to the portion of the object that is tracked. The geometrical shapes 408a to 408c may correspond to the plurality of second geometrical shapes. The CCTV camera 402 may be further configured to compute a second confidence score of each of the geometrical shapes 408a, 408b, and 408c. For the computation of the second confidence score of the second geometrical shapes 408a to 408c, the CCTV camera 402 may be configured to utilize the plurality of parameters (as described in detail in FIG. 2), and perform a weighed summation (based on the equation (3) (FIG. 2)) of the plurality of parameters.

In accordance with an embodiment, the CCTV camera 402 may assign the computed second confidence scores to each of geometrical shapes 408a to 408c in the image frame 404b. For example, the geometrical shape 408a may be assigned the computed second confidence score, such as "9". Similarly, the geometrical shapes 408b and 408c may be assigned the computed second confidence scores, such as "7" and "3", respectively. The confidence score "3" may denote a difficulty in tracking a certain portion of the torso by use of the geometrical shape 408c or a partial occlusion of the torso portion of the human subject with an antenna and hood of the car 410, as shown. The two portions of the object 406 encompassed by the geometrical shape 408a and the geometrical shape 408b, may be tracked in the image frame 404b, by use of the geometrical shapes 408a and 408b.

In accordance with an embodiment, the CCTV camera 402 may be configured to determine a weight for each of the second geometrical shapes, such as the geometrical shapes 408*a*, 408*b*, and 408*c*. For example, the weight of the geometrical shapes 408*a* may be "0.47", which is ratio of the confidence score "9" and a sum of the second confidence scores, such as the sum "19", of the second confidence scores "9", "7" and "3". Similarly, the weight of the geometrical shapes 408*b* may be "0.37" (computed based on the expression "7/19"), and the weight of the geometrical shapes 408*c* may be "0.16" (computed based on the expression "3/19"). The position of the object 406 in the image frames 404*b* and/or 404*c* may be accurately tracked by use of the geometrical shapes 408*a* and 408*b* and their corresponding weights, as described above.

In accordance with an embodiment, the geometrical shape 408*c* may be eliminated for use in the object tracking in the subsequent image frame, such as the image frame 404*c*. The elimination may occur when the cumulative weight, such as "0.16" (of the determined weights) of the geometrical shape 404*c* is below the pre-defined threshold weight, such as "3". Hence, the geometrical shapes 408*a* and 408*b* may be utilized to track corresponding portion of the object 406 in the image frame 404*c*.

Further, in certain instances, when the geometrical shapes 408*a* and 408*b* are used to detect or track the object 406 in the subsequent image frame, such as the image frame 404*c*, the CCTV camera 402 may further compute the second confidence scores of the geometrical shapes 408*a* and 408*b* in the image frame 404*c*. For example, a same confidence score "9" may be computed for both the geometrical shapes 408*a* and 408*b* in the image frame 404*c*. In such instances, when the confidence score of each of the geometrical shapes 408*a* and 408*b* is the same and greater than the pre-defined threshold score, such as "6", the CCTV camera 402 may be configured to merge the geometrical shapes 308*a* and 308*b* into a geometrical shape 308*c*. The geometrical shape 308*c*, in the frame 304*c*, may encompass the face and the torso of the object 306, as shown. The CCTV camera 402 may be configured to track the object 406 in the image frame 404*c*, based on the merged geometrical shape, such as the geometrical shape 308*c*. Thus, as described above, the split and the merge technique is adaptive, and may be referred to as a model-free tracking mechanism as it does not use a pre-determined number of fragments or a geometrical shape of a fixed size or shape or a fixed model.

Figure 5A:
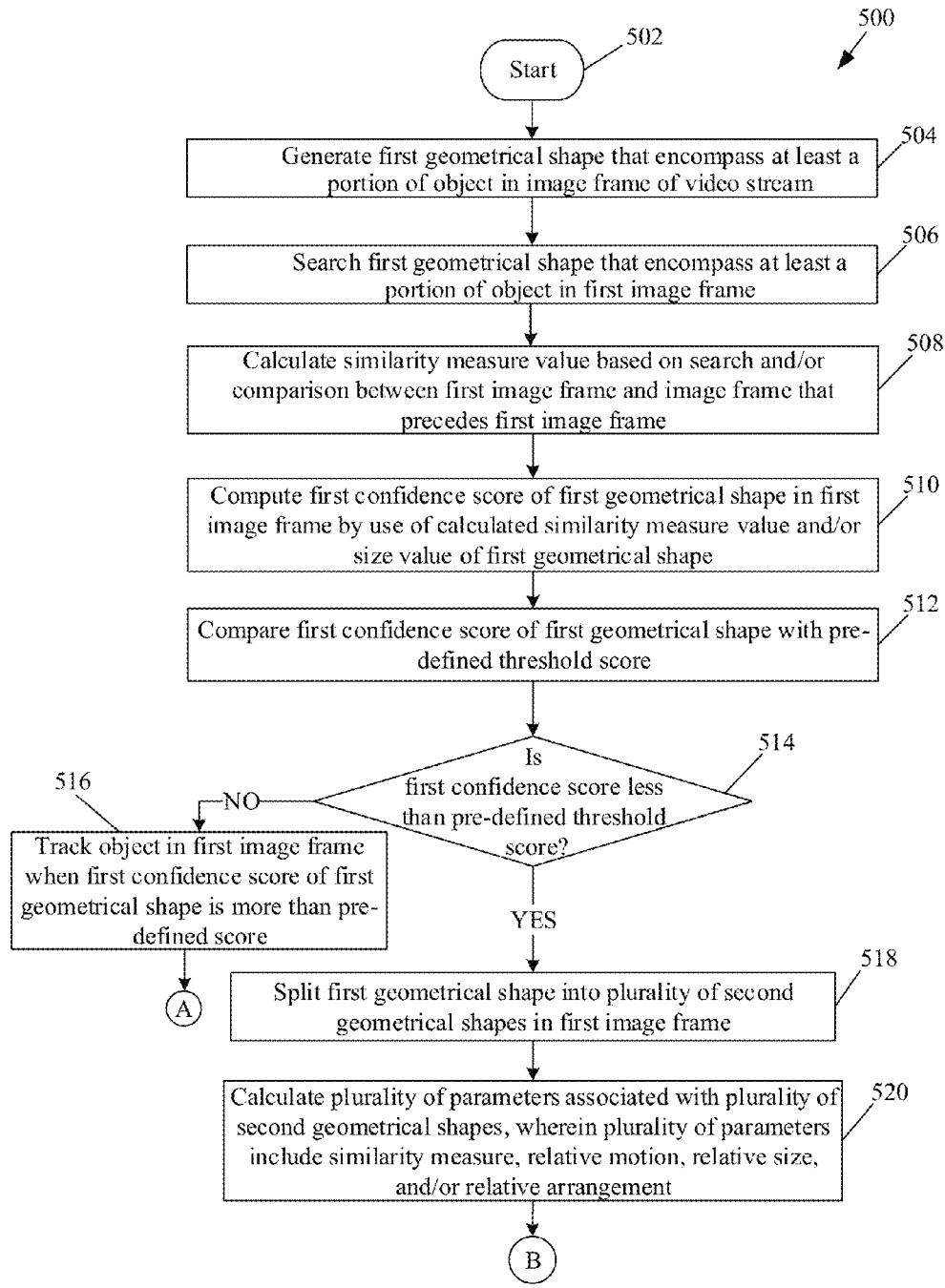
FIGS. 5A and 5B collectively depict a flow chart that illustrates a method to track one or more objects, in accordance with an embodiment of the disclosure.
Figure 5B:
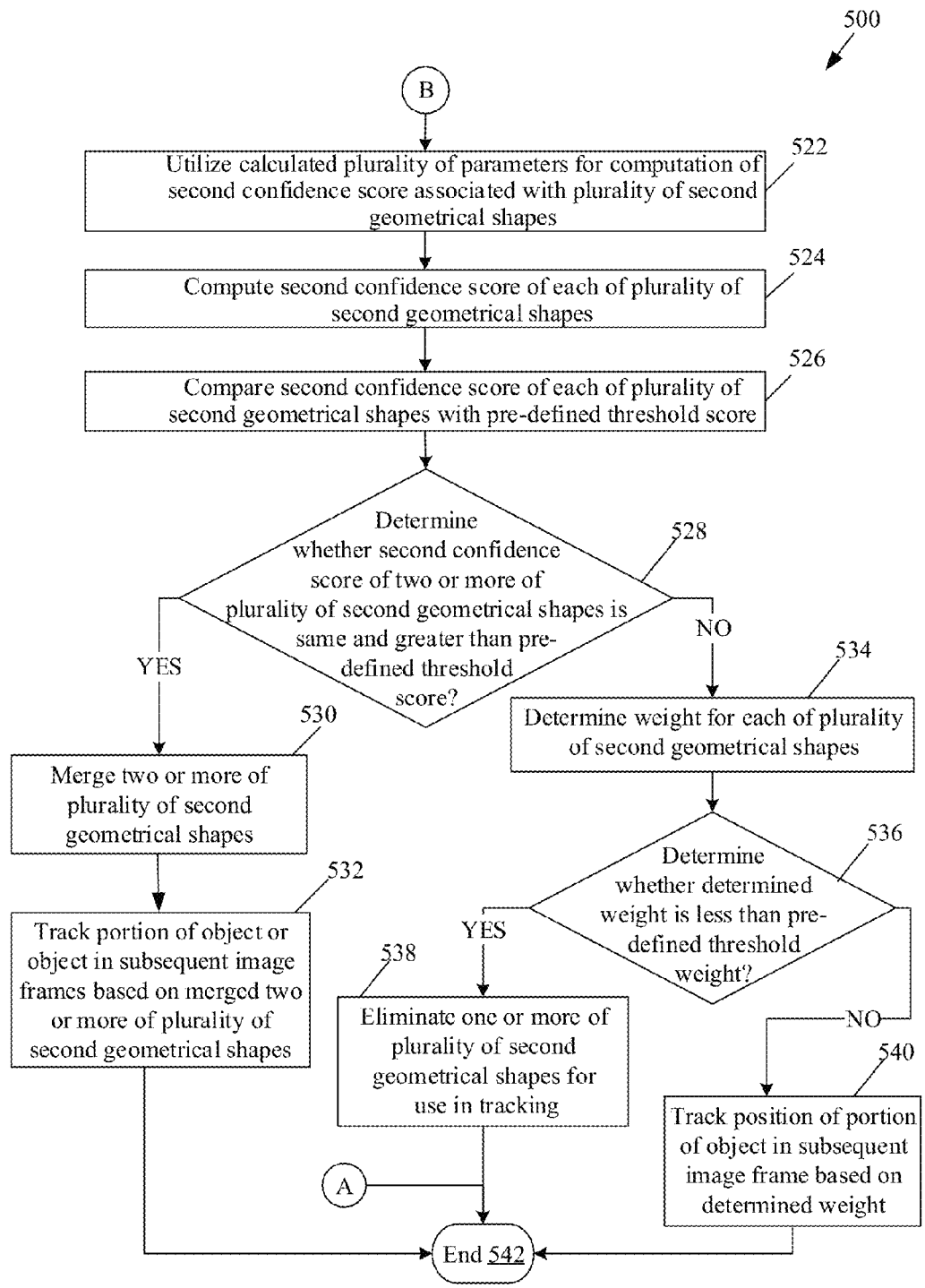

FIGS. 5A and 5B collectively depict a flow chart that illustrates an exemplary method to track objects, in accordance with an embodiment of the disclosure. With reference to FIGS. 5A and 5B, there is shown a flow chart 500. The flow chart 500 is described in conjunction with FIGS. 1, 2, 3 and 4. The method starts at step 502 and proceeds to step 504.

At step 504, a first geometrical shape that may encompass at least a portion of an object in an image frame of the video stream 108 may be generated. At step 506, the first geometrical shape that encompasses at least the portion of the object may be searched for in a subsequent image frame, such as the first image frame.

At step 508, a similarity measure value, such as the score surface value, may be calculated based on the search and/or comparison between the first image frame and the image frame that precedes the first image frame. At step 510, a first confidence score of the first geometrical shape (that encompasses at least the portion of the object), may be computed. The first confidence score of the first geometrical shape may be computed in the first image frame by use of the calculated similarity measure value and/or a size value the first geometrical shape.

At step 512, the first confidence score of the first geometrical shape may be compared with a pre-defined threshold score. At step 514, it may be determined whether the first confidence score of the first geometrical shape is less than the pre-defined threshold score. In instances when the first confidence score of the first geometrical shape is greater than the pre-defined score, the control passes to step 516. In instances when the first confidence score of the first geometrical shape is less than the pre-defined threshold score, the control passes to step 518.

At step 516, when the first confidence score of the first geometrical shape is greater than the pre-defined score, the object may be tracked in the first image frame by use of the first geometrical shape and the first confidence score of the first geometrical shape. The control may pass to the end step 542 or return to the step 508 to process a subsequent image frame of the video stream 108 as per pre-configured settings.

At step 518, the first geometrical shape may be split into a plurality of second geometrical shapes in the first image frame. At step 520, a plurality of parameters associated with the plurality of second geometrical shapes may be calculated. The plurality of parameters includes the similarity measure parameter, the relative motion parameter, the relative size parameter, and/or the relative arrangement parameter associated with the plurality of second geometrical shapes, as described previously in FIGS. 1 and 2.

At step 522, the calculated plurality of parameters may be utilized for computation of a second confidence score associated with the plurality of second geometrical shapes. At step 524, the second confidence score of each of the plurality of second geometrical shapes may be computed. The second confidence score of each of the plurality of second geometrical shapes may be computed based on a weighted summation of the calculated plurality of parameters in accordance with the equation (3) as described in FIG. 2.

At step 526, the second confidence score of each of the plurality of second geometrical shapes may be compared with the pre-defined threshold score. At step 528, it may be determined whether two or more of the plurality of second geometrical shapes is the same and greater than the pre-defined threshold score. In instances when the second confidence score of two or more of the plurality of second geometrical shapes is same and greater than the pre-defined threshold score, the control passes to step 530. In instances when the second confidence score of two or more of the plurality of second geometrical shapes is not greater than the pre-defined threshold, the control passes to step 534.

At step 530, the two or more of the plurality of second geometrical shapes may be merged. At step 532, the portion of the object or the object may be tracked in subsequent image frames, such as the first image frame and/or the second image frame, by use of the merged two or more of the plurality of second geometrical shapes. The control may return to the step 508 to track the portion of the object in the subsequent image frame or may pass to the end step 542, as per pre-configured settings.

At step 534, a weight for each of the plurality of second geometrical shapes may be determined. The weight may be determined based on a ratio of the second confidence score associated with each of the plurality of second geometrical shapes and a sum of second confidence scores of each of the plurality of second geometrical shapes, in accordance with the equation (4) as described in FIG. 2. At step 536, it may be checked whether the determined weight is less than a pre-defined threshold weight. In instances when the determined weight is less than the pre-defined threshold weight, the control may pass to step 538. In instances when the determined weight is greater than the pre-defined threshold weight, the control may pass to step 540.

At step 538, one or more of the plurality of second geometrical shapes may be eliminated for use in tracking when a cumulative weight (of the determined weights) of the one or more of the plurality of second geometrical shapes is less than the pre-defined threshold weight. The control may pass to the end step 542 or return to the step 508 to process a subsequent image frame of the video stream 108, as per pre-configured settings.

At step 540, the position of the portion of the object, such as the object 306, in the subsequent image frame, such as the image frames 304b or 304c, may be tracked based on the determined weight (in step 532) of each of the of the plurality of second geometrical shapes. For example, a maximum weight of a geometrical shape, as compared to others of the plurality of second geometrical shapes, and a weight above a pre-defined threshold weight, may signal an accurate detection of the portion of the object, such the object 306 in the video stream 108. The control may pass to the end step 542 or return to the step 508 to process a subsequent image frame of the video stream 108, as per the pre-configured settings.

In accordance with an embodiment of the disclosure, a system to track one or more objects is disclosed. The system (such as the image-processing device 102 (FIG. 1) may comprise one or more circuits (hereinafter referred to as the processor 202 (FIG. 2)). The processor 202 may be configured to compute a first confidence score of a first geometrical shape that encompass at least a portion of an object in a first image frame of the video stream 108. The first geometrical shape may be utilized to track the object in the video stream 108. The first geometrical shape may be split into a plurality of second geometrical shapes, based on a comparison of the computed first confidence score with a pre-defined threshold score.

Various embodiments of the disclosure may provide a non-transitory computer readable medium and/or storage medium, and/or a non-transitory machine readable medium and/or storage medium having stored thereon, a machine code and/or a set of instructions executable by a machine and/or a computer to track an object in a video stream, such as the video stream 108. The set of instructions in the image-processing device 102 may cause the machine and/or computer to perform the steps that comprise computation of a first confidence score of a first geometrical shape that encompass at least a portion of an object in a first image frame of the video stream 108. The first geometrical shape may be utilized to track the object in the video stream 108. The first geometrical shape may be split into a plurality of second geometrical shapes based on a comparison of the computed first confidence score with a pre-defined threshold score.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embedded in a computer program product, which comprises all the features that may enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A method for object tracking, comprising:
computing, by an image-processing device, a first confidence score of a first geometrical shape encompassing at least a portion of an object in a first image frame of a video stream, wherein said first geometrical shape is utilized to track said object in said video stream; and
splitting, by said image-processing device, said first geometrical shape into a plurality of second geometrical shapes based on a first comparison of said computed first confidence score with a threshold score,
wherein said splitting is based on a size value, of said first geometrical shape, greater than a threshold size.

2. The method according to claim 1, further comprising generating, by said image-processing device, said first geometrical shape encompassing at least said portion of said object in an image frame that precedes said first image frame of said video stream.

3. The method according to claim 1, further comprising detecting, by said image-processing device, a position of at least said portion of said object in said first image frame for said tracking based on said first comparison of said computed first confidence score associated with said first geometrical shape with said threshold score.

4. The method according to claim 2, wherein said first confidence score is computed based on a score surface value that is calculated at a time of search of said generated first geometrical shape, which encompasses said portion of said object in said first image frame.

5. The method according to claim 1, further comprising utilizing, by said image-processing device, said size value of said first geometrical shape for said computation of said first confidence score, wherein said computed first confidence score is directly proportional to said size value of said first geometrical shape.

6. The method according to claim 1, further comprising utilizing, by said image-processing device, a similarity measure value of said first geometrical shape between said first image frame and an image frame that precedes said first image frame for said computation of said first confidence score, wherein said computed first confidence score is directly proportional to said similarity measure value.

7. The method according to claim 1, further comprising computing, by said image-processing device, a second confidence score for each of said plurality of second geometrical shapes for said tracking of at least said portion of said object in said video stream, wherein said second confidence score is assigned to each of said plurality of second geometrical shapes subsequent to said splitting of said first geometrical shape.

8. The method according to claim 7, further comprising calculating, by said image-processing device, a plurality of parameters for said computation of said second confidence score associated with each of said plurality of second geometrical shapes, wherein said plurality of parameters comprises at least one of a similarity measure parameter, a motion parameter, a size parameter, or an arrangement parameter that are associated with said plurality of second geometrical shapes.

9. The method according to claim 8, further comprising weighted summing, by said image-processing device, said calculated plurality of parameters for said computation of said second confidence score, wherein each of said plurality of parameters is associated with a corresponding weight.

10. The method according to claim 8, further comprising merging, by said image-processing device, at least two geometrical shapes of said plurality of second geometrical shapes based on a second comparison of said corresponding second confidence score associated with each of said plurality of second geometrical shapes with said threshold score.

11. The method according to claim 10, wherein at least said two geometrical shapes of said plurality of second geometrical shapes are merged based on said second confidence score, of each of at least said two geometrical shapes, of said plurality of second geometrical shapes, equal or greater than said threshold score.

12. The method according to claim 11, further comprising tracking, by said image-processing device, at least said portion of said object in a second image frame based on said merged at least two geometrical shapes of said plurality of second geometrical shapes.

13. The method according to claim 11, further comprising determining, by said image-processing device, a weight for each of said plurality of second geometrical shapes based on a ratio of said second confidence score associated with corresponding one of said plurality of second geometrical shapes and a sum of said second confidence score of each of said plurality of second geometrical shapes.

14. The method according to claim 13, further comprising comparing, by said image-processing device, said determined weight of each of said plurality of second geometrical shapes with a threshold weight for said tracking of said object or said portion of said object in said first image frame or a second image frame of said video stream.

15. The method according to claim 14, further comprising eliminating, by said image-processing device, usage of at least one second geometrical shape of said plurality of second geometrical shapes for said tracking based on said determined weight, of at least said one second geometrical shape, of said plurality of second geometrical shapes, below said threshold weight.

16. The method according to claim 1, wherein said splitting is based on said computed first confidence score, of said first geometrical shape, less than said threshold score.

17. The method according to claim 1, further comprising determining, by said image-processing device, a count of said plurality of second geometrical shapes for said splitting based on said computed first confidence score of said first geometrical shape.

18. A system for object tracking, comprising:
at least one circuit in an electronic device, at least said one circuit is configured to:
compute a first confidence score of a first geometrical shape encompassing at least a portion of an object in a first image frame of a video stream, wherein said first geometrical shape is utilized to track said object in said video stream; and
split said first geometrical shape into a plurality of second geometrical shapes based on a comparison of said computed first confidence score with a threshold score, wherein said split is based on a size value, of said first geometrical shape, greater than a threshold size.

19. A non-transitory computer-readable storage medium having stored thereon computer-executable instructions for causing a computer to execute operations, the operations comprising:
computing, by an image-processing device, a first confidence score of a first geometrical shape encompassing at least a portion of an object in a first image frame of a video stream, wherein said first geometrical shape is utilized to track said object in said video stream; and
splitting, by said image-processing device, said first geometrical shape into a plurality of second geometrical shapes based on a comparison of said computed first confidence score with a threshold score,
wherein said splitting is based on a size value, of said first geometrical shape, greater than a threshold size.

20. A method for object tracking, comprising:
computing, by an image-processing device, a first confidence score of a first geometrical shape encompassing at least a portion of an object in a first image frame of a video stream, wherein said first geometrical shape is utilized to track said object in said video stream;
splitting, by said image-processing device, said first geometrical shape into a plurality of second geometrical shapes based on a comparison of said computed first confidence score with a threshold score; and
determining, by said image-processing device, a count of said plurality of second geometrical shapes for said splitting based on said computed first confidence score of said first geometrical shape.

* * * * *